(12) United States Patent
Moore (10) Patent No.: US 8,024,360 B2
(45) Date of Patent: Sep. 20, 2011

(54) METHOD AND APPARATUS FOR MAINTAINING MULTIPLE SETS OF IDENTITY DATA

(75) Inventor: Paul Moore, Mercer Island, WA (US)

(73) Assignee: Centrify Corporation, Mountain View, CA (US)

( * ) Notice: Subject to any disclaimer, the term of this patent is extended or adjusted under 35 U.S.C. 154(b) by 695 days.

(21) Appl. No.: 11/009,921

(22) Filed: Dec. 10, 2004

(65) Prior Publication Data

US 2006/0129570 A1 Jun. 15, 2006

(51) Int. Cl.
*G06F 7/00* (2006.01)
*G06F 17/30* (2006.01)

(52) U.S. Cl. ........................ 707/785

(58) Field of Classification Search ............. 705/40; 709/220; 370/328; 713/182; 707/1, 9, 785, 707/999.001, 999.009, 999.01
See application file for complete search history.

(56) References Cited

U.S. PATENT DOCUMENTS

| | | | |
|---|---|---|---|
| 7,263,717 B1 * | 8/2007 | Boydstun et al. | 726/4 |
| 2002/0019936 A1 * | 2/2002 | Hitz et al. | 713/165 |
| 2003/0177389 A1 * | 9/2003 | Albert et al. | 713/201 |
| 2004/0019936 A1 * | 1/2004 | Shannon | 800/312 |
| 2004/0267909 A1 * | 12/2004 | Autret | 709/220 |
| 2005/0097041 A1 * | 5/2005 | Campbell et al. | 705/40 |
| 2005/0289354 A1 * | 12/2005 | Borthakur et al. | 713/182 |
| 2006/0002328 A1 * | 1/2006 | Naghian | 370/328 |

* cited by examiner

*Primary Examiner* — Mohammad Ali
*Assistant Examiner* — Patrick Darno
(74) *Attorney, Agent, or Firm* — Blakely, Sokoloff, Taylor & Zafman (57) ABSTRACT

A method of assigning the UNIX computers in a network to one of a plurality of groups called zones, of creating independent sets of UNIX identity information for each network entity (user or group) for separate zones, and of associating an entity's sets of UNIX entity information with a single global entity record for the entity in the network's identity resolver. A further method of allowing a UNIX computer to request entity information from the identity resolver, and of the identity resolver returning resolved entity information appropriate for the requesting computer's zone. A further method of managing sets of zone-specific UNIX identity information in the identity resolver to ensure that entity names and entity identification numbers are not duplicated within a zone and to all the same names and numbers to be duplicated across zones. Other embodiments are also described.

10 Claims, 9 Drawing Sheets

AD User Record (global user record)

| Global user name | alex.hsu@acme.com | |
|---|---|---|
| 540 — standard user account data | | |
| | zone 1 | zone 2 |
| UNIX user name | alex.hsu | ahsu |
| UID | 1517 | 5330 |
| Shell type | /bin/csh | /bin/csh |
| Home directory | /home/alex | /nfs/ahsu |
| Primary group | alex.hsu | service |

AD User Record (global user record) — 300, 320, 395

| Global user name | alex.hsu@acme.com | |
|---|---|---|
| | ... standard user account data ... | | 330
| | zone 1 | zone 2 |
| UNIX user name | alex | ahsu |
| UID | 1299 | 5001 |
| Shell type | /bin/csh | /bin/csh |
| Home directory | /home/alex | /nfs/ahsu |
| Primary group | alex | operator |

340 — UNIX user name
350 — UID
360 — Shell type
370 — Home directory
380 — Primary group
390 — zone 1
310

Figure 4

AD Group Record (global group record) — 400, 420

| Global group name | faculty | |
|---|---|---|
| | ... standard group account data ... | | 430
| | zone 1 | zone 3 |
| UNIX group name | teachers | profs |
| GID | 11000 | 101 |

440 — UNIX group name
450 — GID
410

Figure 5

AD User Record (global user record) — 500, 510

| Global user name | alex.hsu@acme.com |
|---|---|
| ... standard user account data ... | 520 |

| | zone 2 |
|---|---|
| UNIX user name | ahsu |
| UID | 5330 |
| Shell type | /bin/csh |
| Home directory | /nfs/ahsu |
| Primary group | service |

Figure 6A

AD User Record (global user record)

| Global user name | alex.hsu@acme.com | |
|---|---|---|
| 540 — standard user account data | | |

| | zone 1 | zone 2 |
|---|---|---|
| UNIX user name | alex.hsu | ahsu |
| UID | 1517 | 5330 |
| Shell type | /bin/csh | /bin/csh |
| Home directory | /home/alex | /nfs/ahsu |
| Primary group | alex.hsu | service |

AD User Record (global user record)

| Global user name | alex.hsu@acme.com | |
|---|---|---|
| 560 — standard user account data | | |

| | zone 1 | zone 2 |
|---|---|---|
| UNIX user name | alex | ahsu |
| UID | 1517 | 5330 |
| Shell type | /bin/csh | /bin/csh |
| Home directory | /home/alex | /nfs/ahsu |
| Primary group | staff | service |

AD Group Record (global group record) — 600, 610

| Global group name | operators | |
|---|---|---|
| 620 — standard group account data — 630 | | |

| | zone 1 | zone 2 |
|---|---|---|
| UNIX group name | staff | service |
| GID | 11000 | 101 |

Figure 7A

AD Group Record (global group record)

| Global group name | operators | | |
|---|---|---|---|
| ... standard group account data ... | | | /640 |
| | zone 1 | zone 2 | zone 3 |
| UNIXgroupname | staff | service | operators — 660 |
| GID | 11000 | 101 | 2010 |

METHOD AND APPARATUS FOR MAINTAINING MULTIPLE SETS OF IDENTITY DATA

BRIEF DESCRIPTION OF THE INVENTION

Embodiments of this invention work with computers running UNIX (or a variation of UNIX) and an identity resolver (such as a directory server) within a network of computers. Embodiments of the invention allow the association of multiple sets of UNIX identity information (user or group names, user or group identification numbers, and similar data) with a single global entity record in an identity resolver database. When the user logs on to a UNIX computer, an embodiment of the invention selects the correct set of UNIX identity information based on the logical grouping of computers (called a zone) to which that UNIX computer belongs. The UNIX computer also uses the UNIX identity information at other times for identity lookup such as when the computer looks up the UNIX user name associated with a given UNIX user identification number.

BACKGROUND

Any network of UNIX computers relies on identity information to identify computer users and groups of computer users on the network. For example, when a user logs onto a network computer, he provides a user name to identify himself. Once the user is logged in, he is associated with a pre-assigned user identification number (UID) that is used within any computer on the network to identify that user. Files use UIDs to indicate file ownership, and UNIX operations use UIDs to report user activity. Other user identity information may specify the user's real name, the user's home directory, the type of shell he prefers to use, and the primary group of users to which he belongs.

Groups of users within a network likewise have identity information: a group name and an associated group identification number (GID).

Identity information is typically stored by an identity resolver (usually a directory server) attached to the network. The resolver stores the data in user records and group records, known collectively as entity records. The resolver may be an Active Directory (AD) server, a Lightweight Directory Access Protocol (LDAP) server, or other type of identity resolver such as a relational database.

Any computer can request identity information from the resolver by supplying an entity identifier (typically a user name, UID, group name, or GID). When a user logs on to a UNIX computer and supplies a user name, for example, the computer can request the UID, home directory, preferred shell, and principal group associated with that user name. Or a computer can ask the directory server to find the user name associated with the UID indicated as the owner of a file.

Entity identifiers used within a single network of UNIX computers must be unique for each entity within the network. If, for example, two users have the same user name, or if a single user name is associated with two different UIDs, then computers in the network cannot establish identity for a user name or UID. The same is true for group names and GIDs.

When a single UNIX network grows from scratch into a full network, entity name and ID duplication is generally not a problem. Each newly generated user name, UID, group name, and GID is checked against existing names and IDs to make sure it is not a duplicate.

Problems frequently arise, however, when two or more existing UNIX networks are linked together and their directories are consolidated into a single master directory for all networks. Because the original directories have developed names and IDs in ignorance of each other, it is not only possible but likely that they have used the same entity names and ID numbers. When the directories are consolidated, these identical names and IDs conflict, make user and group identity uncertain, and require that many user and group records be reassigned unique names and IDs. This creates a significant amount of work for system administrators and often confuses users who may be forced to use a new name for log-on.

SUMMARY OF THE INVENTION

Embodiments of this invention provide methods of creating multiple sets of UNIX identity information for each network entity, one information set for each group of UNIX computers (called a zone) in the network. Each of these information sets is a zone entity record. A zone entity record contains zone-specific information for an entity. That information identifies and defines the entity within a single zone of computers. For example, a zone entity record may contain UNIX identity information such as a UNIX user name, UID, preferred shell, primary group, and a home directory that identifies a user within a single zone.

An embodiment of the invention stores zone entity records in the identity resolver for the network. The embodiment also stores a set of global entity records there. A global entity record contains identity information that identifies an entity across all zones and any other computers in the network, including non-UNIX computers. A global entity record contains a global entity name and other identity information. A global user record, for example, contains a global user name that identifies a user throughout the entire network, and might also contain a password for the user, the user's real name, and other user information.

Embodiments of the invention associate all zone entity records for a single entity with the global entity record for the same entity. The identity resolver can use the associations in a global entity record to find zone entity records for an entity. For example, a directory server can find a global user record and examine an associated zone user record that contains UNIX identity information for the user within a particular zone. It is convenient to think of the global entity record as containing all its associated zone entity records, but these records need not be kept together physically in a single database. All that is necessary is that the zone data associated with a global entity record be accessible given a global entity identifier and a zone identifier, and vice versa: that a zone record contain enough information to locate its associated global record.

All the computers in a zone use a common set of user names, UIDs, group names, and GIDs. These identifiers are unique and non-conflicting within the zone. Computers in a second, different zone also use a common set of identity data for that second zone. However, identity data may conflict between zones. For example, the computers of a first zone may learn from the resolver that UID 504 identifies files and processes in the first zone that belong to John Doe, while the computers of a second zone may learn that the same UID, 504, identifies files and processes in the second zone that belong to a different entity, Mary Smith. John Doe and Mary Smith will possess unique, non-conflicting global entity identifiers, but (as this example shows) they may be associated with conflicting zone entity records.

Embodiments of this invention also provide methods of dividing the UNIX computers in a network into one or more groups called zones. A single zone is specified for each UNIX computer.

The methods of an embodiment of this invention allow a UNIX computer in a network to make an identity query about an entity and receive resolved entity information that is appropriate for the entity within the computer's zone. The UNIX computer specifies an entity using an entity identifier (a user name or a UID, for example) in an identity query to the identity resolver. The query also communicates zone identity information from which the identity resolver can determine the querying computer's zone.

When the identity resolver receives an identity query from a UNIX computer in a zone, it locates a global entity record that corresponds to the query-specified entity, along with the zone entity records associated with the global entity record. The identity resolver then finds the zone entity record that corresponds to the inquiring computer's zone and returns resolved entity information that contains zone-specific information for the entity. That information will be appropriate for use on all computers that are members of the querying computer's zone. This type of identity query may occur, for example, when a UNIX computer performs a system lookup of a UID, user name, GID, or group name to determine identity information for a user or group in that zone.

An identity query may also occur during a user log-on, when the computer uses the supplied user name as an entity identifier in a query to find the appropriate global user record in a directory server and return the corresponding UID, home directory, preferred shell, and primary group for that user in the computer's zone. The methods of embodiments of this invention allow a user to log on to a computer by providing a zone user name that is specific to the zone or by providing a global user name that is recognized for all computers in the network.

The methods of this invention provide tools within the identity resolver to manage zone-specific information within each zone entity record. They allow duplicate entity names and entity identification numbers across different zones within the same network but prohibit duplication within each zone. The methods allow an administrator to restrict an entity's access to one or more zones by not providing zone entity records for those zones for the entity.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 4 illustrates a global user record stored in an identity resolver with associated zone user records in accordance with one embodiment of the invention.

FIG. 5 illustrates a global group record stored in an identity resolver with associated zone group records in accordance with one embodiment of the invention.

DETAILED DESCRIPTION OF THE INVENTION

This disclosure refers to UNIX user and group data at several levels of abstraction. For precision and ease of reference, Applicant provides the following definitions, which will be used throughout the specification and in the claims.

UNIX is defined to be the UNIX operating system, a UNIX-like operating system, or variants of the UNIX operating system such as the Linux operating system or the Macintosh OS X operating system.

Entity is defined to be either a user or a user group.

Identifier is either a name or an identification number that unambiguously identifies an entity.

Figure 1A:
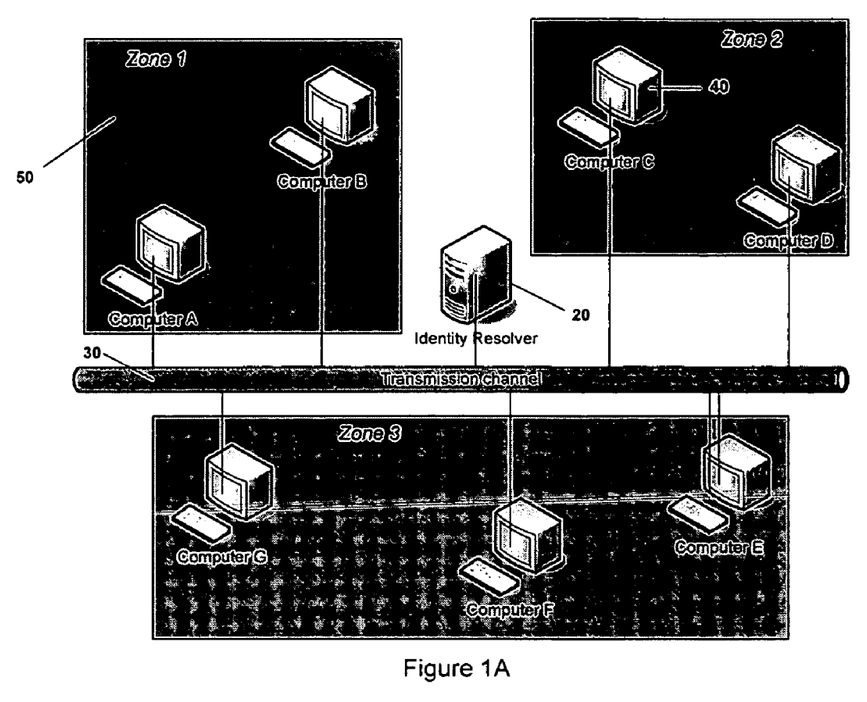
FIG. 1A illustrates a computer network organized into zones in accordance with one embodiment of the invention.

FIG. 1A illustrates a network of computers that may be operated in accordance with an embodiment of the invention. The network includes an identity resolver (20) in communication through a transmission channel (30) with a set of UNIX computers such as that specified by label (40). The computers in the network can number from several to a great number.

The identity resolver (20) can use any directory technology. This description uses Microsoft's Active Directory (AD) as an example, but the identity resolver might also be an LDAP server, a relational database, or other directory technology. The identity resolver can be a single server or a set of servers that supply unified identity resolution service to the network.

The transmission channel (30) can be any wired or wireless transmission channel.

The computers (40) in this network have each been assigned to a single zone such as Zone 1 shown by label (50). The number of zones in the network can range from one to as many zones as there are computers. In this example, Zone 1 includes computers A and B, Zone 2 includes computers C and D, and Zone 3 includes computers E, F, and G.

Figure 1B:
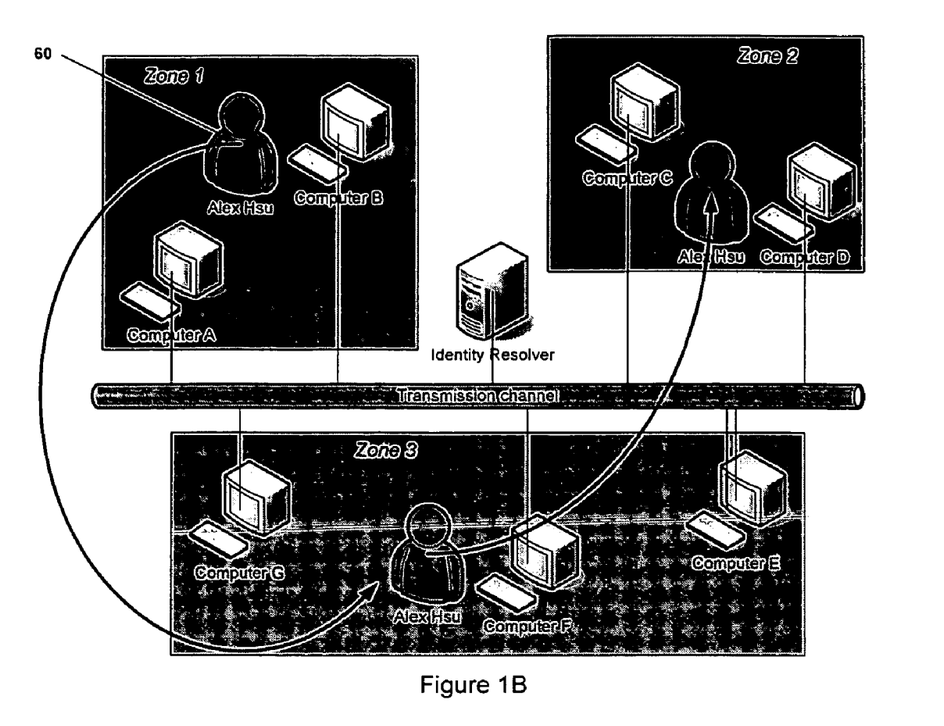
FIG. 1B illustrates how a user may log on to computers in different zones in the network defined in FIG. 1A.

FIG. 1B illustrates how a computer user (60) can log on to any UNIX computer in the network illustrated in FIG. 1A. In this example, Alex Hsu logs on to computer B in Zone 1, then later logs on to computer F in Zone 3 and later still into computer D in Zone 2. At each log-on, the user must supply a user name to identify himself. That user name may be a zone-specific user name or a global user name.

Figure 2:
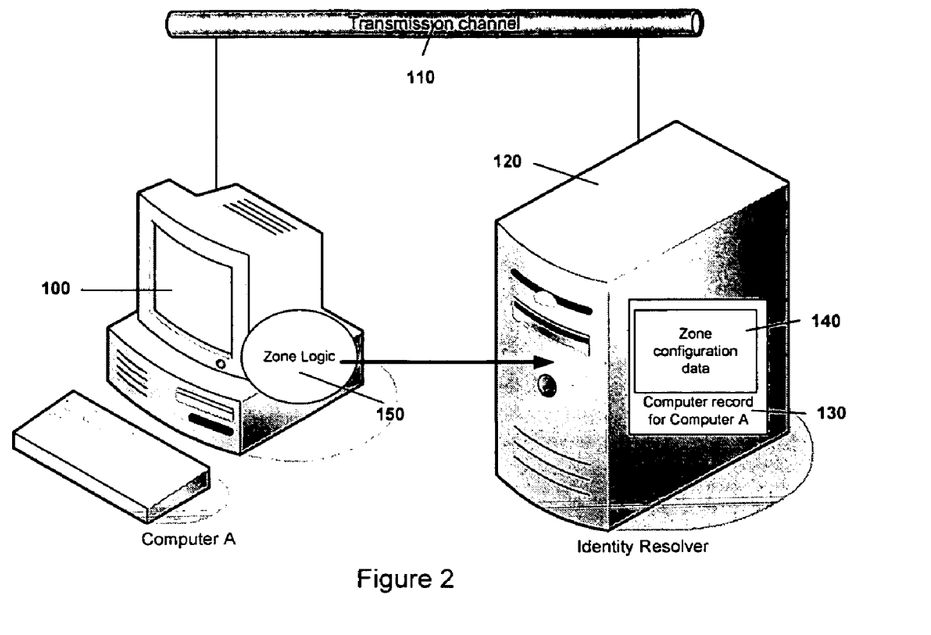
FIG. 2 illustrates a UNIX computer configured to operate in a zone in accordance with one embodiment of the invention.

FIG. 2 illustrates a UNIX computer (100) configured to operate in a zone. The computer is connected by the network's transmission channel (110) to the identity resolver (120). In this embodiment of the invention, the identity resolver contains a computer record (130) that stores information about the computer (100). The computer record contains zone configuration data (140) that specifies the zone to which the computer belongs. This zone configuration data (140) may also be stored in any other location accessible by the computer or identity resolver, whether it is on the computer itself or elsewhere in the network.

The computer contains zone logic (150) that is part of embodiments of the invention. The logic is used whenever a process running on the computer (100) requests user or group information from the identity resolver (120). This logic (150) consults the computer record (130) to determine the computer's zone, adds zone identity data to the request to identify the computer's zone, then sends the request to the identity resolver (120). The logic receives resolved entity information from the identity resolver in response.

Although the zone logic in this example resides on each UNIX computer, it does not have to reside there. It may also reside on the identity resolver where it determines a zone for a computer requesting identity information and then returns identity information appropriate for that zone. The resolver may determine the zone through an explicit zone identifier contained in a computer's request, or it may determine the zone through an implicit zone identifier accompanying the request. For example, an implicit zone identifier may be the Internet Protocol (IP) address, or another type of network address, of the requesting computer; or the method in which the request was received. The identity resolver can use the implicit zone identifier to determine the requesting computer's zone.

Figure 3:
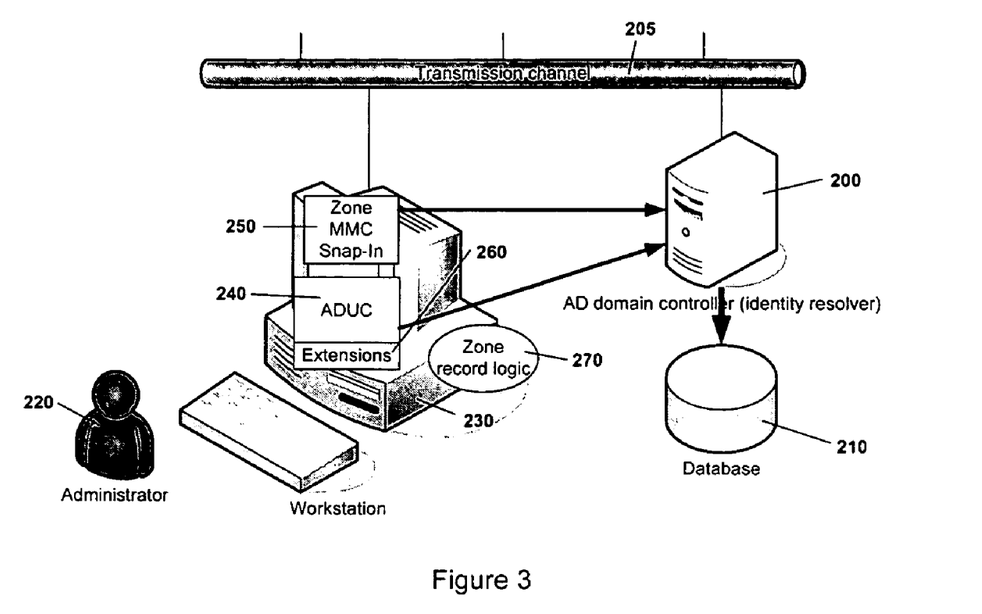
FIG. 3 illustrates an identity resolver and workstation configured to supply resolved entity information to requesting computers in accordance with one embodiment of the invention.

FIG. 3 illustrates an identity resolver (200) used to supply zone-specific entity information to requesting computers. The identity resolver is connected via the network's transmission channel (205) to other computers.

Figure 6A:
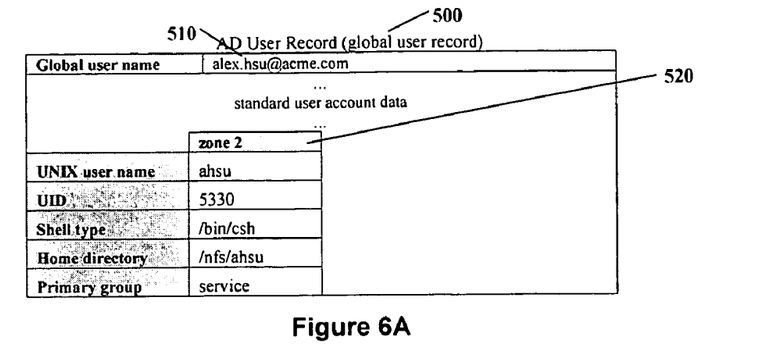
FIG. 6A illustrates a global user record associated with a single zone user record in accordance with one embodiment of the invention.
Figure 6B:
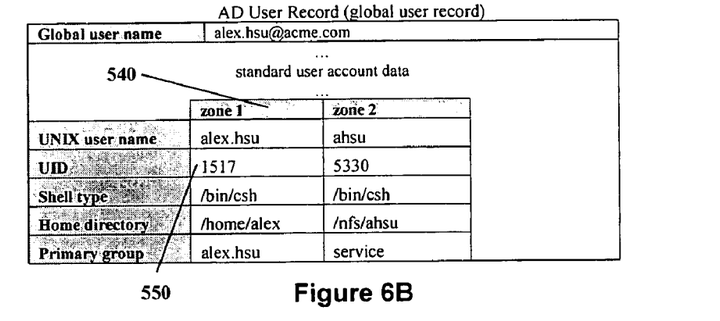
FIG. 6B illustrates a global user record associated with an additional zone user record filled with default zone data in accordance with one embodiment of the invention.
Figure 6C:
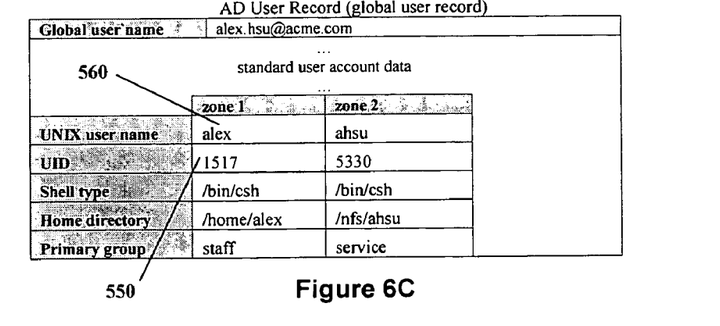
FIG. 6C illustrates a global user record with administrator-edited zone data in a zone user record accordance with one embodiment of the invention.

In this example, the identity resolver is a domain controller for Active Directory (AD), a Microsoft product that can provide directory information for both Windows and UNIX computers, but it might also be any directory server such as LDAP or a relational database. The identity resolver stores global entity records, zone entity records, and computer records on an accompanying database (210). The information stored by this particular embodiment of the invention for entity records is shown in FIGS. 4, 5, and 6.

In this implementation, the identity resolver (200) used for the invention requires no special alterations or additions except for modified records. In other implementations of this invention, the zone logic that—in this implementation—resides on each UNIX computer in the network may reside instead on the identity resolver.

The identity resolver in this implementation is managed by an administrator (220) through a separate workstation (230) that is connected to the identity resolver via the network's transmission channel (205). This workstation provides the Active Directory Users and Computers console (ADUC) (240), a user interface that the administrator can use to manage records stored in the identity resolver. The workstation also provides a zone management console in the form of a snap-in component (250) for the Microsoft Management Console (MMC). The administrator can use this snap-in in as an alternative to the ADUC to managed stored records. The administrator can also use the MMC snap-in (250) to manage the zones themselves as described later.

The ADUC (240) has been customized with a set of zone extensions (260), a part of this invention that provides additional user interface controls to work with zone data within identity resolver records. The MMC snap-in (250) is a completely customized component, also a part of this embodiment, that provides the same additional user interface controls for working with zone data within identity resolver records.

Both the ADUC and the MMC snap-in work with zone record logic (270) installed on the workstation to help manage zone-specific information within records. The logic adds default zone-specific information to a zone entity record when requested. The logic also checks to ensure that when zone-specific information is added to a zone entity record that the entity name (user name or group name) and entity identification number (UID or GID) for the zone entity record are unique among all zone entity records affiliated with the same zone.

The MMC snap-in (250) supplies additional zone-management features. The snap-in displays the computers in each zone, reports on zone status, and allows an administrator (230) to create and remove zones and to set zone names.

The ADUC (240) and MMC snap-in (250) are just an example for this description. The administration console could just as well be one or more standard or custom consoles for any other identity resolution technology. To implement the methods of an embodiment of this invention, the console or consoles would be extended to handle zone-specific data within identity resolver records, to manage zones, and to ensure that entity names and entity identification numbers within a single zone are unique.

FIG. 4 shows a global user record (300) that is—in this example—an Active Directory user record. The global user record (300) is associated with zone user records (310) that contain additional zone-specific identity information. (This record could also be an LDAP record or any other standard record used by the identity resolver.) The zone user records (310) may be associated with the global user record (300) either by extending the existing global user record (300) if the identity resolver permits such extension or by other methods such as creating additional records or attaching external files.

The global user record (300) contains the global user name (320), which in this implementation is the user name provided in an Active Directory user record. The record contains other standard user record information (330) such as a password and a real user name that are typically stored in an Active Directory user record. The record is associated with a set of zone user records (310) that each contain the following information for a single zone in the network: a UNIX user name (340), a UID (350), the user's preferred shell (360), the user's home directory (370), and the name of the user's primary group (380). Each zone user record (310) may contain additional zone-specific information as well.

The zone user records (310) associated with the global user record (300) provide discrete sets of zone-specific information for the user in zero or more zones. In this example, there are zone entity records for zone 1 (390) and zone 2 (395).

If the global user record (300) is not associated with a zone user record (310) for a zone defined in the network, the user has no account in that zone and cannot log into a computer belonging to that zone. In this example, Alex Hsu's global user record is not associated with a zone user record for zone 3 and so he cannot log into that zone.

Adding zone user records (310) to an Active Directory record (300) in this implementation of the invention involves creating child instances of an object that defines zone user information. Each Active Directory user record contains one child instance for each zone user record.

Adding zone user records (310) to an LDAP record typically involves adding a multi-valued attribute to each LDAP user record. Each row in the attribute contains the information for a zone user record.

Adding zone user records (310) to a relational database typically involves creating a new table for each zone. Each table contains zone-specific data for all users enabled for a zone. The key to retrieving zone-specific data for a single user (which constitutes a zone user record) is the global user name and the zone identity information. The key for UID lookup is the UID and the zone identity information.

FIG. 5 shows a global group record (400) that is—in this example—an Active Directory group record. The global group record (400) is associated with zone group records (410) that contain additional zone-specific identity information. These zone group records (410) are associated with the global group record using the same methods described previously in the description of a global user record. (The global group record could also be an LDAP record or any other standard record used by the identity resolver.)

The global group record (400) contains the global group name (420), which in this implementation is the group name provided in an Active Directory directory group record. The global group record (400) contains other standard group record information (430). The record is associated with a set of zone group records (410) that each contain the following information for a single zone in the network: a UNIX group name (440) and a GID (450). Each zone group record (410) may contain additional zone-specific information as well.

If the global group record (400) is not associated with a zone group record (410) for a zone defined in the network, the group does not exist in that zone. In this example, there is no associated zone group record for zone 2 for this group, so the group does not exist in zone 2.

Adding zone-specific data to a global group record uses the same techniques for AD, LDAP or an identity resolver as described for global user records in FIG. 4.

FIG. 6 illustrates the process that occurs when an administrator sets up a global user record (500) in the identity resolver to include a zone user record for a zone in the network. The global user record in this implementation is an Active Directory user record. The administrator begins by running the enhanced ADUC and finding an appropriate global user record (500), in this case for Alex Hsu of FIG. 1. Although this example uses the ADUC to work with a user record, other types of identity resolvers would supply an alternate form of record management.

FIG. 6A shows the original global user record (500): the global user name (510) for the record is "alex.hsu@acme.com". The administrator looks at the zone user records (520) associated with the global user record (500), and sees that Alex is enabled to log on to zone 2, but not zone 3 or zone 1 because there are no zone user records for those zones.

FIG. 6B shows the global user record after the administrator asks the enhanced ADUC to enable Alex Hsu for zone 1. The ADUC creates a new zone user record for zone 1 (540), associates the new record with the global user record, and fills in default information in the zone user record for zone 1. It also generates a UID (550) for the zone user record (540) and ensures that the UID (550) is unique within zone 1.

FIG. 6C shows the global user record after the administrator edits the default zone information in the new zone user record. If the administrator attempts to create a UNIX user name (560) or UID (550) that is not unique for the zone, the enhanced ADUC will not allow it. Once the administrator is finished and the modified record is stored, Alex Hsu is now enabled to log on and work in all the computers in zone 1. Because there is no zone user record for zone 3 associated with the global user record, Hsu cannot log on to any computers in zone 3.

Figure 7A:
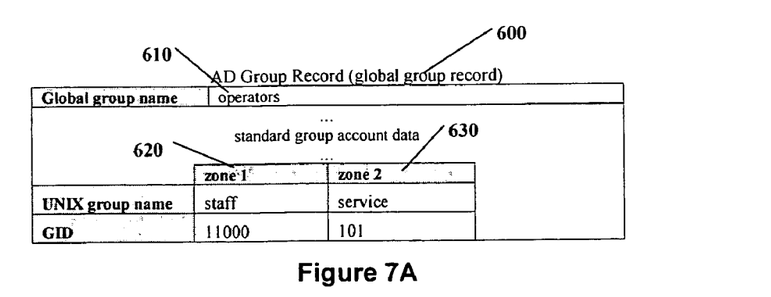
FIG. 7A illustrates a global group record associated with two zone group records in accordance with one embodiment of the invention.
Figure 7B:
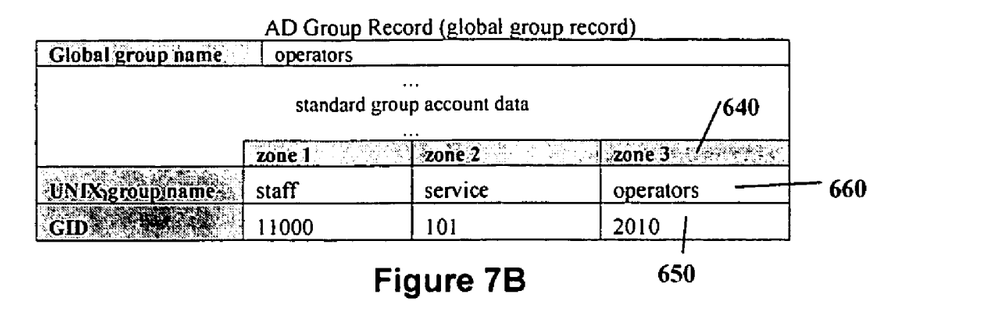
FIG. 7B illustrates a global group record with an additional zone group record filled with default zone data in accordance with one embodiment of the invention.

FIG. 7 illustrates the process that occurs when an administrator sets up a global group record in the identity resolver to include information for a zone in the network. In this implementation, the global group record is an Active Directory group record. Although this example uses the ADUC to work with a group record, other types of identity resolvers would supply an alternate form of record management.

FIG. 7A shows the global group record (600): the global group name (610) for the record is "operators". The administrator looks at the zone group records associated with the global group record and finds them for zones 1 (620) and 2 (630) but not for zone 3. This means that the group exists in zones 1 and 2, but not in zone 3.

FIG. 7B shows the zone group records after the administrator asks the enhanced ADUC to enable the group for zone 3. The ADUC creates a new zone group record (640) for zone 3, attaches it to the global group record, generates a GID (650) for the zone that is unique within the zone, and uses the directory group name for the UNIX group name (660) within the zone group record after ensuring that the name is unique in the zone.

Figure 8:
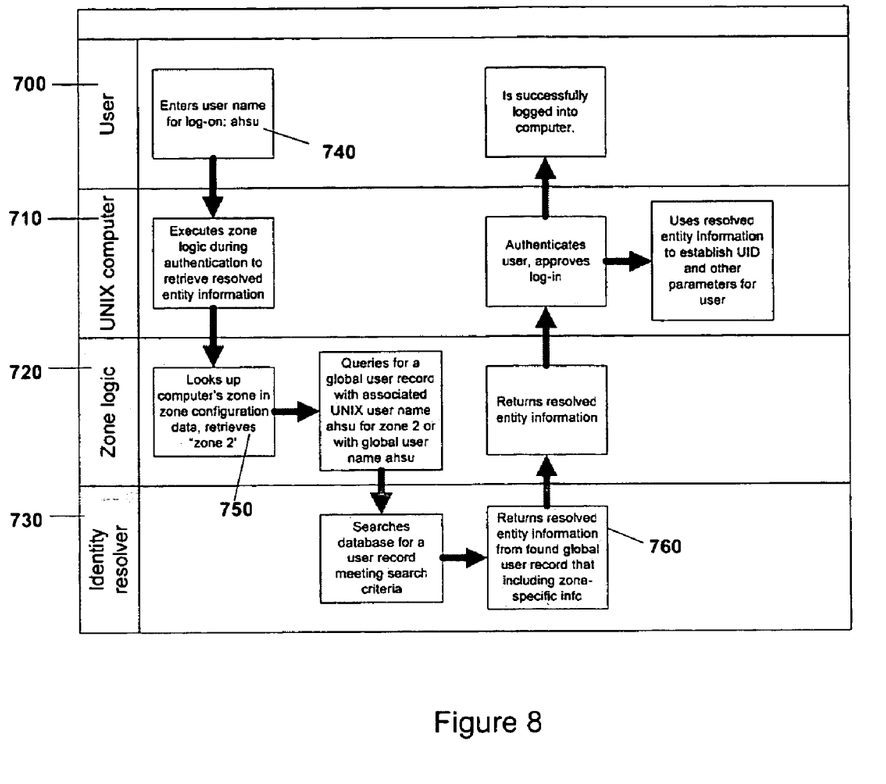
FIG. 8 illustrates the process that occurs when a user attempts log-on through a UNIX computer in the network in accordance with one embodiment of the invention.

FIG. 8 illustrates the process that occurs when a user (700) attempts log-on through a UNIX computer (710) in the network. For this example, the user enters his UNIX user name (740) for zone 2, of which the computer (710) is a member. In another case the user might enter his global user name instead. The UNIX user name in this example is "ahsu".

The computer (710), while in the process of authenticating the log-on, executes its zone logic (720) to retrieve resolved entity information for the supplied UNIX user name (740). The zone logic (720) reads the zone configuration data and retrieves the name of its computer's zone (750)—in this case, "zone 2." The logic (720) queries the identity resolver (730) for resolved entity information that is appropriate for the user in zone 2. To do so, the logic (720) requests that the identity resolver (730) look through all UNIX user names specified in zone user records for zone 2 to find a match for the supplied UNIX user name (740) and, if that fails, to search for the supplied user name among all global user names—in other words, to search outside zone-specific UNIX user names.

If the identity resolver (730) finds a match either in zone 2 UNIX user names or in the global user names for all zones, it returns resolved entity information (760) from the global user record where the match was found. The resolved entity information (760) may include information necessary for user authentication. It may also include global user information and zone-specific information such as UID, home directory, preferred shell, and primary group.

If the user (700) had provided a global user name and the identity resolver (730) found a matching global user record but could not find a zone user record for zone 2, then the look-up would have failed.

If the look-up succeeds, the zone logic (720) returns the information (760) to the computer (710), which can proceed with authentication and can use the resolved entity information as necessary for future interactions with the user.

Note that because the logic (720) looks for a user name (740) in both zone user records and in global user records, a user (700) may log on successfully using either his UNIX user name for the zone or his global user name. For example, Alex Hsu can log into a UNIX computer (710) in zone 2 using either his zone user name "ahsu" (740) or his global user name "alex.hsu@acme.com". His UNIX user name (740) is not guaranteed to work in other zones, because he might have different UNIX user names defined in those zones. His global user name, however, will work for log-on in any zone in which he is enabled.

Figure 9:
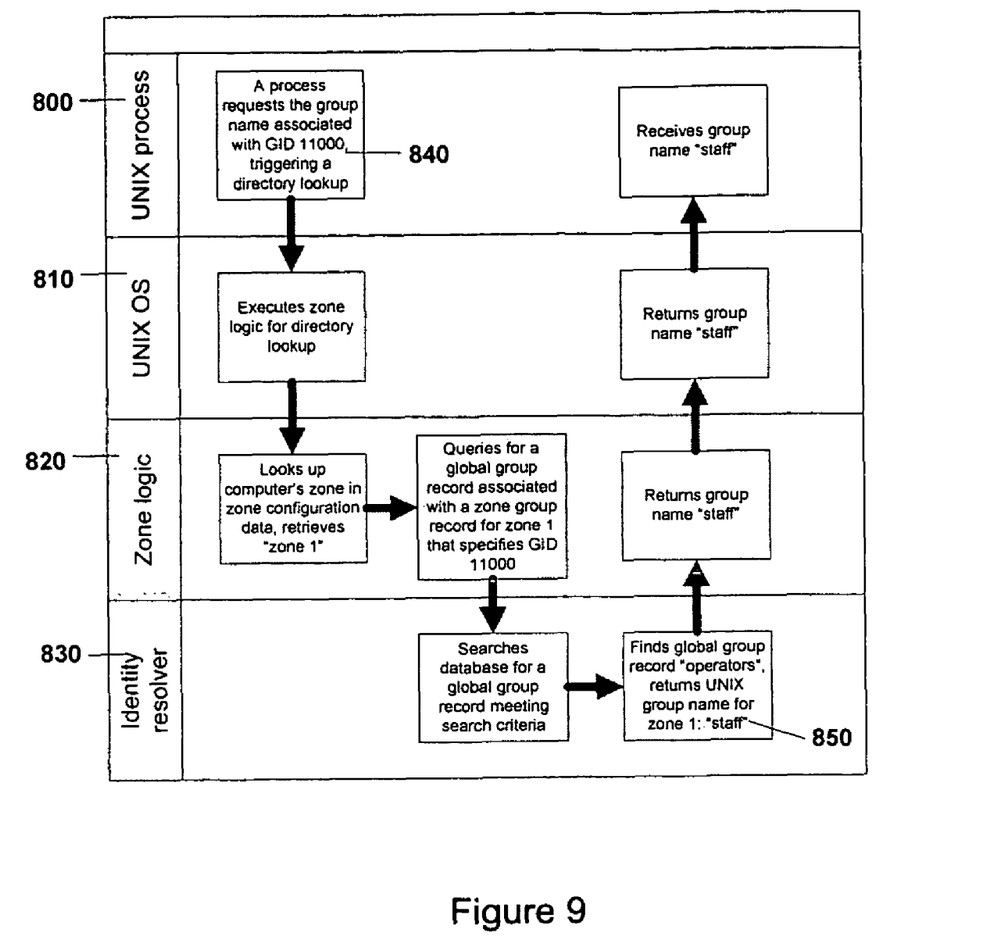
FIG. 9 illustrates the process that occurs when a process running on a UNIX computer requests a group information lookup from the identity resolver in accordance with one embodiment of the invention.

FIG. 9 illustrates the actions that occur when a process (800) running on a UNIX computer requests a group information lookup from the identity resolver (830). The process supplies a GID number (840) and requests the corresponding group name from the UNIX operating system (810). The UNIX OS executes the zone logic (820), which looks up the computer's zone in the zone configuration data, finds "zone 1", then queries the identity resolver (830) to find any zone group record specifying the GID 11000 (840) for zone 1.

The identity resolver (830) finds the GID in a zone group record associated with a global group record using the global group name "operators". The identity resolver (830) looks up the UNIX group name (850) in the associated zone record for zone 1, finds "staff", and returns that name to the zone logic (820). The zone logic (820) returns "staff" to the UNIX OS (810), which returns it to the requesting process (800).

The foregoing description of specific embodiments of the present invention are presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

I claim:

1. A computer-readable storage medium storing instructions that, when executed by a UNIX client computer, cause the computer to perform operations comprising:
obtaining a user identifier from a user;
determining a zone of the UNIX client computer from zone identity information located on the UNIX client computer, wherein said zone identity information is a computer identifier created by an administrator via an administration console;
selecting a global user record using the user identifier, said global user record including a global user name and zone information for a plurality of zones, one of which is the determined zone; and
retrieving from said selected global user record first information corresponding to said user identifier and second information corresponding to said user identifier and said zone information from said determined zone, wherein the second information is at least a UNIX UID for the determined zone;
enabling said user to logon to said UNIX client computer if and only said global user record is associated with said zone information for the determined zone,
wherein said user identifier and said UNIX UID have different values.

2. The computer-readable storage medium of claim 1 wherein the zone identity information identifies one zone of said plurality of zones, said plurality including at least a first zone and a second zone, where a first user record of the first zone may conflict with a second user record of the second zone.

3. The computer-readable storage medium of claim 1 wherein the zone identity information is an explicit zone identifier obtained with the user identifier.

4. The computer-readable storage medium of claim 1 wherein the zone identity information is implicit in a method by which user identifier was obtained.

5. The computer-readable storage medium of claim 4 wherein the zone identity information may be inferred from a method by which the user identifier was received.

6. The computer-readable storage medium of claim 1 wherein the user identifier is a global user name.

7. The computer-readable storage medium of claim 1 wherein the first information and second information from the global user record is at least one of a global user name, a password, a real name, a preferred shell, a home directory location, a UNIX username, a UNIX group name and a UNIX GID.

8. A computer-readable storage medium storing instructions that, when executed by a UNIX client computer, cause the computer to perform operations comprising:
obtaining a user identifier from a user;
determining a zone of the UNIX client computer from zone identity information located on the UNIX client computer, wherein said zone identity information is a computer identifier created by an administrator via an administration console;
said UNIX client computer selecting a zone user record using the user identifier and the zone;
selecting a global user record using said zone user record, said global user record including a global user name and zone information for a plurality of zones, one of which is the determined zone;
retrieving from said selected global user record first information corresponding to said user identifier and second information corresponding to said user identifier and said zone information from said determined zone, wherein the second information is at least a UNIX UID for the determined zone;
enabling said user to logon to said UNIX client computer if and only if said global user record is associated with said zone information for the determined zone,
wherein said user identifier and said UNIX UID have different values.

9. A computer-readable storage medium storing instructions that, when executed by a UNIX client computer, cause the computer to perform operations comprising:
determining a zone of the UNIX client computer from zone identity information located on the UNIX client computer, wherein said zone identity information is a computer identifier created by an administrator via an administration console;

said UNIX client computer selecting a zone user record located in an identity resolver database using a user identification number and the zone;

selecting a global user record using said zone user record, said global user record including a global user name and zone information for a plurality of zones, one of which is the determined zone;

retrieving from said selected global user record first information corresponding to a user identifier and second information corresponding to said user identification number and said zone information from said determined zone, wherein the second information is at least a UNIX UID for the determined zone;

enabling a user to logon to said UNIX client computer if and only if said global user record is associated with said zone information for the determined zone, wherein said global user name and said UNIX UID have different values.

10. A computer-readable storage medium storing instructions that, when executed by a UNIX client computer, cause the computer to perform operations comprising:

determining a zone of the UNIX client computer from zone identity information located on the UNIX client computer, wherein said zone identity information is a computer identifier created by an administrator via an administration console;

said UNIX client computer selecting a zone user record located in an identity resolver database using a user identification number and the zone, said identity resolver database including a global user record, said global user record including a global user name and said zone user record;

retrieving from said zone user record information corresponding to said user identification number and said zone;

enabling a user to logon to said UNIX client computer if and only if said global user record is associated with zone information retrieved from said zone user record for the determined zone, wherein said global user name and said user identification number have different values.

* * * * *